US010831845B2

(12) United States Patent
Jagadeesan et al.

(10) Patent No.: US 10,831,845 B2
(45) Date of Patent: Nov. 10, 2020

(54) GENERATION OF ENHANCED SEARCH RESULTS

(71) Applicant: Google LLC, Mountain View, CA (US)

(72) Inventors: Ram Brijesh Jagadeesan, Sunnyvale, CA (US); Camille McMorrow, Brooklyn, NY (US); Ranjith Jayaram, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 291 days.

(21) Appl. No.: 15/966,931

(22) Filed: Apr. 30, 2018

(65) Prior Publication Data

US 2019/0205476 A1    Jul. 4, 2019

Related U.S. Application Data

(60) Provisional application No. 62/611,035, filed on Dec. 28, 2017.

(51) Int. Cl.
*G06F 16/00* (2019.01)
*G06F 16/9535* (2019.01)
(Continued)

(52) U.S. Cl.
CPC .......... *G06F 16/9535* (2019.01); *G06F 16/23* (2019.01); *G06F 16/958* (2019.01);
(Continued)

(58) Field of Classification Search
CPC ............... G06F 16/953; G06F 16/9535; G06F 16/9538; G06F 16/9577; G06F 16/958; G06F 16/24575; G06F 16/972; G06F 3/0482; G06F 16/23; G06Q 50/01; G06Q 30/0256; G06Q 30/0251; H04L 63/102; H04L 63/0815
See application file for complete search history.

(56) References Cited

U.S. PATENT DOCUMENTS 9,311,362 B1 * 4/2016 Trew ...................... G06F 16/951
9,536,259 B2 * 1/2017 Collins ............... G06Q 30/0255
(Continued)

OTHER PUBLICATIONS

'moneycontrol.com' [online] "Google Makes Listing Your Businesses Easier," Sep. 6, 2017, [ retrieved on Aug. 27, 2018] Retrieved from Internet: URL <https://www.moneycontrol.com/news/business/google-makes-listing-your-businesses-easier-2380277.html> 1 page.

*Primary Examiner* — Merilyn P Nguyen
(74) *Attorney, Agent, or Firm* — Fish & Richardson P.C.

(57) ABSTRACT

Methods, systems, and apparatus, including computer programs encoded on a computer storage medium, for receiving, at a search engine, a search query submitted by a user to the search engine; identifying an entity that is associated with the search query; determining that the user that submitted the search query to the search engine is associated with the entity in an entity listing portal; and in response to determining that the user that submitted the search query to the search engine is associated with the entity in an entity listing portal, providing a search results webpage that includes i) search results that the search engine generated responsive to the search query and ii) an interface through which edits to data associated with the entity within the entity listing portal can be provided.

15 Claims, 5 Drawing Sheets

(51) Int. Cl.
  *H04L 29/06* (2006.01)
  *G06F 16/23* (2019.01)
  *G06F 16/958* (2019.01)
  *G06F 16/957* (2019.01)
  *G06Q 30/02* (2012.01)
  *G06Q 50/00* (2012.01)

(52) U.S. Cl.
  CPC ..... *G06F 16/9577* (2019.01); *G06Q 30/0251* (2013.01); *H04L 63/0815* (2013.01); *G06Q 50/01* (2013.01)

(56) References Cited

U.S. PATENT DOCUMENTS

| | | | |
|---|---|---|---|
| 2010/0146452 A1 | 6/2010 | Rose et al. | |
| 2013/0110825 A1* | 5/2013 | Henry | G06F 16/951 |
| | | | 707/723 |
| 2014/0282219 A1* | 9/2014 | Haddock | G06F 16/36 |
| | | | 715/781 |
| 2016/0335264 A1* | 11/2016 | Behal | G06F 16/24578 |
| 2017/0017503 A1* | 1/2017 | Levy | G06F 3/0483 |
| 2017/0147364 A1* | 5/2017 | Shaposhnikov | G06F 8/35 |
| 2019/0236094 A1* | 8/2019 | Sharifi | G06F 16/955 |

* cited by examiner

GENERATION OF ENHANCED SEARCH RESULTS

CROSS-REFERENCE TO RELATED APPLICATIONS

This application claims priority to U.S. Application Ser. No. 62/611,035, filed on Dec. 28, 2017, the disclosure of which is expressly incorporated herein by reference in its entirety.

FIELD

The present specification relates to search engines.

BACKGROUND

In general, entity information can be provided on a webpage, such that users can view details about an entity. For example, for a business entity, entity information that can be provided on the webpage may include an address of the business, user-provided reviews of the business, and pictures of the business.

SUMMARY

According to some innovative aspects of the subject matter described in this specification, an owner of an entity, or other user that is closely associated with the entity, can access, edit, and/or update entity information that is stored by an entity listing portal interface on a search results page. Specifically, the owner, or other user that is closely associated with the entity, when logged in during a search session, can provide a search query for the entity that the owner owns. The owner, or other user that is closely associated with the entity, can provide the search query within a search page to initiate obtaining such entity information. The search engine, while in the search session, can access the entity information that is stored in a separate system—the entity listing portal interface. The search engine is able to i) determine that the search query is related to a particular entity and ii) that the user that is providing the search query is the owner of the entity, or other user that is closely associated with the entity. Thus, the owner, or other user that is closely associated with the entity, does not have to log in to a separate system—the entity listing portal interface—to access entity information of the entity, thereby saving time and computational resources, and avoiding a separate, second authentication step.

The search engine provides a search results page that includes i) search results responsive to the query and ii) a portal interface that allows the owner to access, edit, or update information of the entity as provided by the entity listing portal interface. Thus, the owner, or other user that is closely associated with the entity, does not have to log in to a separate system—the entity listing portal interface—to access entity information of the entity.

Innovative aspects of the subject matter described in this specification may be embodied in methods that include the actions of receiving, at a search engine, a search query submitted by a user to the search engine; identifying an entity that is associated with the search query; determining that the user that submitted the search query to the search engine is associated with the entity in an entity listing portal; and in response to determining that the user that submitted the search query to the search engine is associated with the entity in an entity listing portal, providing a search results webpage that includes i) search results that the search engine generated responsive to the search query and ii) an interface through which edits to data associated with the entity within the entity listing portal can be provided.

Other embodiments of these aspects include corresponding systems, apparatus, and computer programs, configured to perform the actions of the methods, encoded on computer storage devices.

These and other embodiments may each optionally include one or more of the following features. For instance, the search engine is included in a system that comprises (i) the search engine, and (ii) an entity listing portal engine that includes an entity listing database for storing data associated with entities, the interface through which the edits can be provided is provided by the entity listing portal engine of the system, without requiring the user to separately log in to or perform a separate authentication to the entity listing portal engine. The search query includes keywords that refer to the entity. The entity is associated with one or more of the search results. The entity is associated with a knowledge panel that is triggered based on the search query. The user is associated with the entity in the entity listing portal as an owner of the entity that is established through a verification process. Determining that the user is logged in during a search session that includes the submission of the search query by the user to the search engine; and in response to determining that the user is logged in during a search session that includes the submission of the search query by the user to the search engine, comparing login credentials of the user with the entity listing portal to determine that the user is associated with the entity in the entity listing portal. The edits to the data associated with the entity within the entity listing portal can include associating a photo with the entity in the entity listing portal, providing a comment responsive to a consumer-provided review of the entity trough a computer-implemented social network, and generating a computer-implemented social network post relating to the entity.

Particular implementations of the subject matter described in this specification can be implemented so as to realize one or more of the following advantages. For example, implementations of the subject matter provide for the efficient usage of computer resources as two separate logins into two separate system is avoided. To efficiently use the computer resources, only a single log in is needed from the user to access a search engine service and an entity listing portal service. Thus, computer resources such as network traffic is reduced as the client device handling the log-in procedures only needs to communicate with a single server computing system over the network—e.g., the server computing system associated with the search engine service.

Furthermore, verification of the user as the owner of an entity is streamlined as a separate verification process is not needed. Specifically, verification of the owner of the entity is conducted only once by the search engine service. This reduces latency of providing the entity listing portal interface within a search results page for interaction by the user, and efficiently utilizes network resources, including conserving bandwidth of the network.

The details of one or more embodiments of the subject matter described in this specification are set forth in the accompanying drawings and the description below. Other potential features, aspects, and advantages of the subject matter will become apparent from the description, the drawings, and the claims.

DETAILED DESCRIPTION

Figure 1:
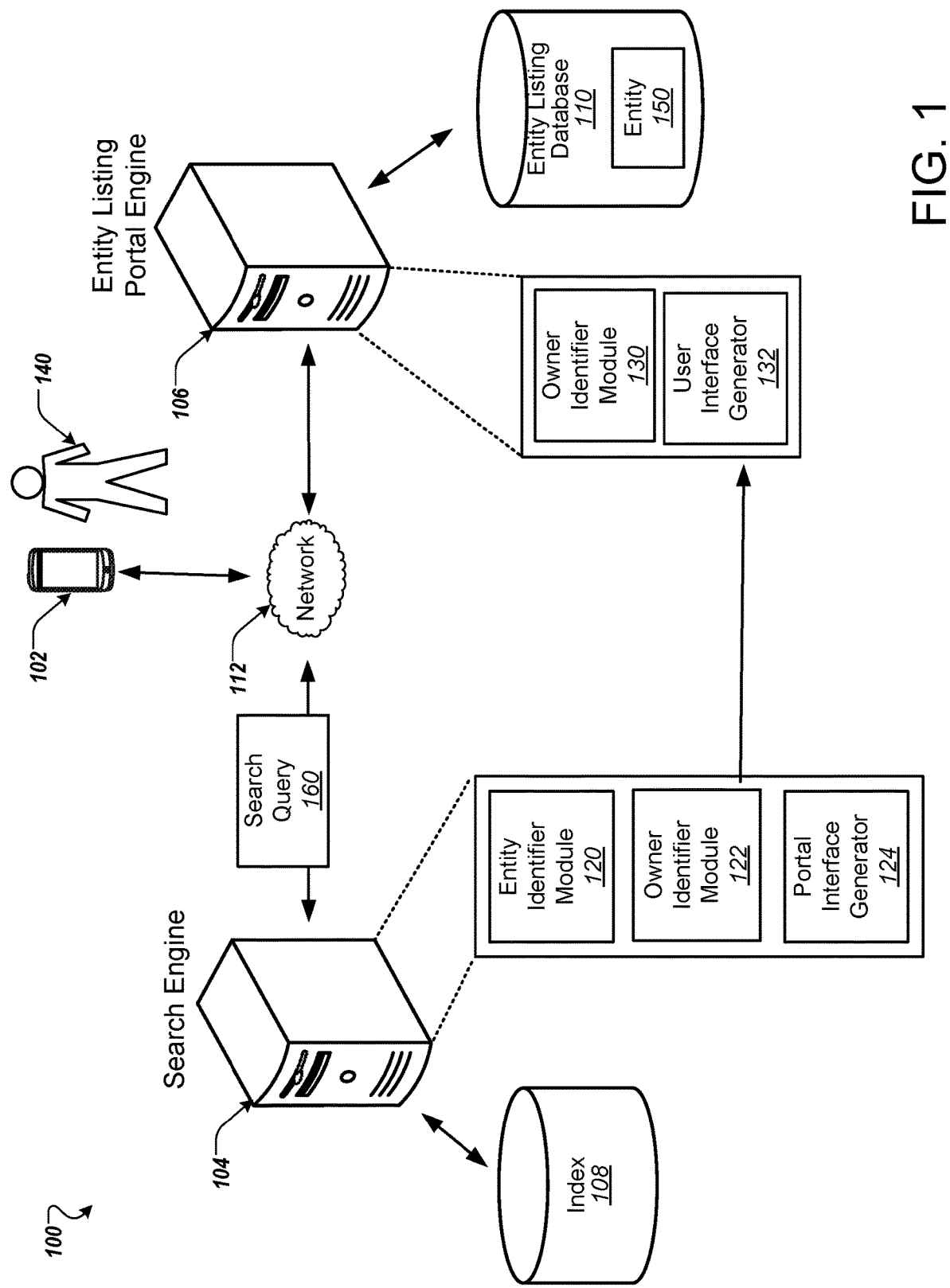
FIG. 1 depicts a system for presentation of an entity portal interface within a search results page.

FIG. 1 depicts a system 100 for presentation of an entity portal interface within a search results page. The system 100 includes a computing device 102, a search engine 104, an entity listing portal engine 106, a search engine index 108, an entity listing database 110, and a network 112. The search engine 104 can include an entity identifier module 120, an owner identifier module 122, and a portal interface generator 124. The entity listing portal engine 106 includes an owner identifier module 130, and a user interface generator 132. The search engine 104 is in communication with the index 108, and the entity listing portal engine 106 is in communication with the entity listing database 110. Further, the computing device 102 is in communication with the search engine 104 and the entity listing portal engine 106 over the network 112.

In some examples, a user 140 is associated with an entity that is referenced by the entity listing database 110. For example, the user 140 can be an owner of the entity. For example, the entity can include a small business, and the user 140 is a small business owner. To that end, the entity listing database 110 includes entity information that can be edited, updated, or accessed by the respective owner—note that the term "owner" can include the actual owner of the entity, or any person, or party that has been granted access to the associated entity information. In some examples, this entity information, or a portion thereof, is provided to other users for viewing, e.g., on a search results page or within a computer-implemented social network.

The user 140 logs into a system that controls access to the entity listing database 110. For example, the user 140 provides log-in credentials to the computing device 102 through an interface specific to the entity listing portal engine 106. The computing device 102 provides the log-in credentials to the entity listing portal engine 106. In response, the owner identifier module 130 verifies the submitted log-in credentials of the user 140, and determines that the log-in credentials are associated with an entity 150 that is referenced by the entity listing database 110. That is, the owner identifier module 130 determines that the user 140 has permission to access data associated with the entity 150 that is stored by the entity listing database 110, including editing and/or updating such information.

In response to verifying that the user 140 has access to the data associated with the entity 150 that is stored by the entity listing database 110, the user interface generator 132 generates a user interface to facilitate interaction and management by the user 140 with the data associated with the entity 150 that is stored by the entity listing database 110. Specifically, the user interface generator 132 generates such an interface and the entity listing portal engine 106 provides the interface to the computing device 102 over the network 112. The user 140 can interact with the interface that is generated by the user interface generator 132 to edit, update, and/or access the data associated with the entity 150 that is stored by the entity listing database 110. After the user 140 provides such updates and/or edits to the data associated with the entity 150 that is stored by the entity listing database 110 through the generated interface, the entity listing portal engine 106 updates the data associated with the entity 150 that is stored by the entity listing database 110 accordingly.

Such access to the data of the entity 150 stored by the entity listing database 110 is provided using a separate "service"—e.g., the entity listing portal engine 106. That is, a "service" that is separate from other "services" that the user 140 might interact with, e.g., "services" the user 140 might interact with more frequently. For example, the user 140 might interact with a searching service daily, or multiple times daily, while interacting with the entity listing portal engine 106 less frequently, e.g., once every few days or weekly. Thus, by providing access to the entity listing database 110 through a "service" more commonly used by the user 140 can facilitate interaction with the data of the entity 150 stored by the entity listing database 110. This avoids the user 140 having to log in to two separate "services" and rather provide login credentials that are common to the entity listing portal engine 106 and a "service" that is used more frequently by the user 140. To that end, to facilitate interaction with the entity listing database 110 to provide management of the data of the entity 150, the system 100 provides management of the data of the entity 150 through the search engine 104, described further herein.

In some implementations, the user 140 has provided login credentials for a search service. For example, the user 140 has interacted with a search service interface provided by the search engine 104 to the computing device 102 that is displayed on the computing device 102. The computing device 102 provides the search service login credentials to the search engine 104 over the network 112. The computing device 102 can verify the user 140 based on the login credentials.

Figure 2:
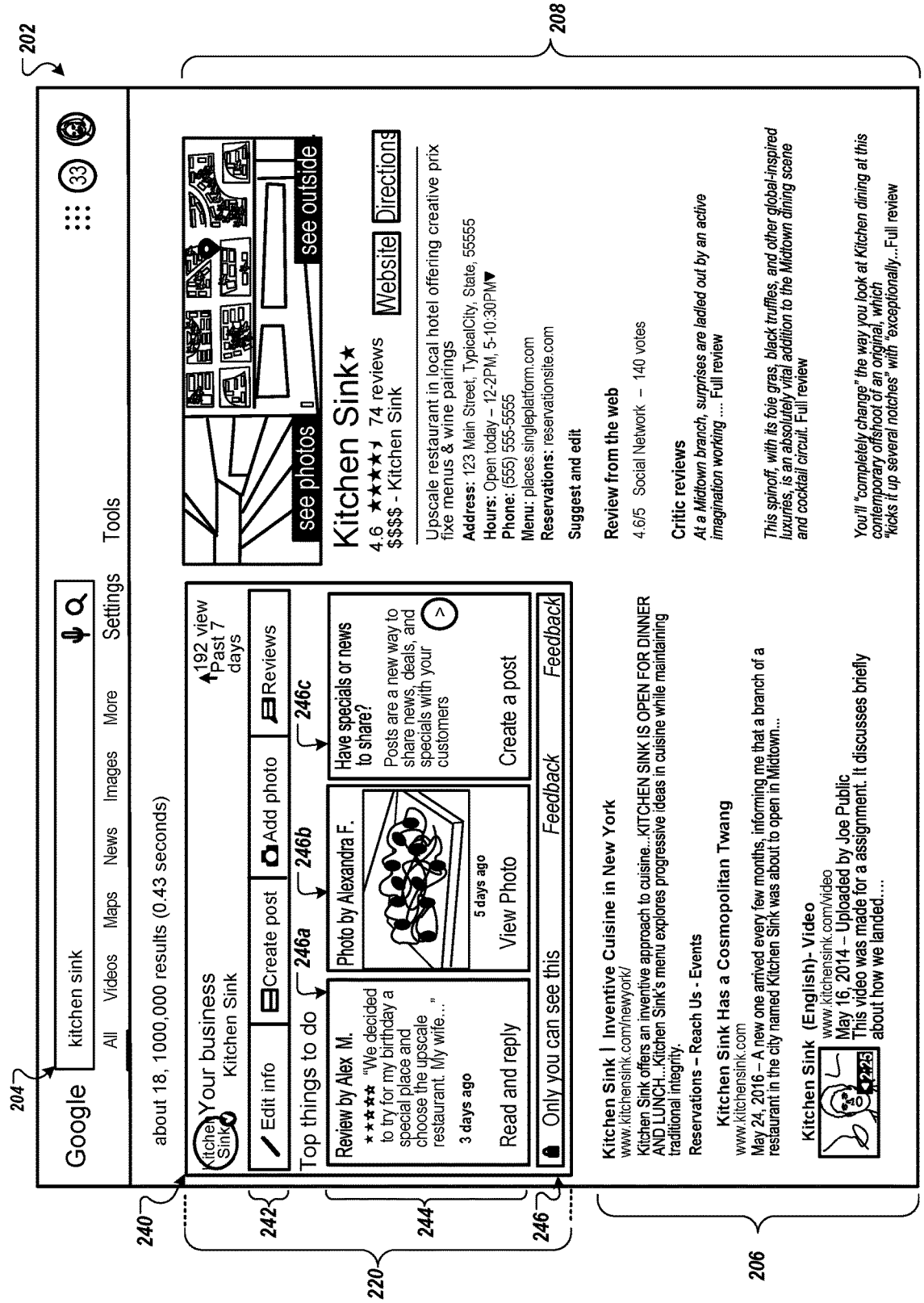
FIG. 2 depicts a search results page including the entity portal interface, in a first example.

In some examples, while the user 140 is logged in to the search service provided by the search engine 104, the user 140 wishes to access data of the entity 150 that the user 140 is associated with. For example, the user 140 is interested in managing and/or accessing the data of the entity 150 to update and/or edit such information. To initiate such access to the data of the entity 150 stored by the entity listing database 110, the user 140 can provide a search query that is associated with the entity 150. For example, during a search session in which the user 140 is logged in to the search service provided by the search engine 104, the user 140 provides a search query 160 utilizing the computing device 102. The computing device 102 provides the search query 160 to the search engine 104 over the network 112. FIG. 2 illustrates an example search results page 202. The search results page 202 includes a search query box 204 that the user 140 can interact with to provide the search query 160. In the illustrated example, the search query 160 includes the keywords "kitchen sink."

The search engine 104 receives the search query 160, and in response, analyzes the search query 160. In some examples, analyzing the search query 160 by the search engine 104 can include identifying an entity that is associated with the search query 160. For example, the entity identifier module 120 identifies one or more keywords of the search query 160. As shown in FIG. 2, the keywords of the search query 160 include "kitchen sink." In some examples, the entity identifier module 120 determines that the keywords of the search query 160 refer to an entity, e.g., an entity referred to by the entity listing database 110. In the illustrated example, the entity identifier module 120 determines that the keywords "kitchen sink" refer to the entity 150—that is, the entity 150 is a business named "Kitchen Sink." In some examples, the entity identifier module 120 can determine that the keywords of the search query 160 refer to an entity by matching the keywords of the search query 160 to keywords associated with the entity 150. Such matching can include full or partial matching.

In some examples, analyzing the search query 160 by the search engine 104 can include identifying one or more organic search results responsive to the search query 160. As illustrated in FIG. 2, responsive to the search query 160 "kitchen sink," the search engine 104 provides search results 206. The entity identifier module 120 can analyze the search results 206 to identify the entity 150 that is associated with the search query 160. For example, the entity identifier module 120 can determine that a threshold quantity of the search results 206 refer to the entity 150, and in response, determine that the search query 160 associated with the search results 206 is associated with the entity 150. In some cases, a search result 206 can refer to the entity 150 by including data or metadata that refers to the entity 150 by name, e.g., "kitchen sink," or includes other referencing information, e.g., a physical address, associated with the entity 150.

In some examples, analyzing the search query 160 by the search engine 104 can include identifying a knowledge panel that is responsive, e.g., triggered by, the search query 160. As illustrated in FIG. 2, response to the search query 160 "kitchen sink," the search engine 104 identifies the knowledge panel 208. Specifically, the search engine 104 accesses a knowledge graph—e.g., a data structure that represents entities and relationships between the entities. The search engine 104 can identify the knowledge panel 208 based on the knowledge graph for the search query 160, and provide the knowledge panel 208 responsive to the search query 160. For example, the entity identifier module 120 can identify the knowledge panel 208 that is triggered for the search query "kitchen sink." In response to such identification, the entity identifier module 120 can identify the entity 150 that is associated with the knowledge panel 208.

In some implementations, the owner identifier module 122 determines that the user 140 that submitted the search query 160 to the search engine 104 is associated with the entity 150 in the entity listing database 110. Specifically, in some examples, the owner identifier module 122 accesses the login credentials provided by the computing device 102 when the user 140 is engaging in the search session. The owner identifier module 122 can compare the login credentials with the entity listing database 110 to determine that the user 140 is associated with the entity 150. For example, the entity 150 can be associated with login credentials, e.g., as stored by the entity listing database 110, and the owner identifier module 122 can determine that the login credentials provided by the user 140 matches the login credentials associated with the entity 150. In response, the owner identifier module 122 determines that the user 140 is associated with the entity 150. In some examples, the user 140 is associated as an owner of the entity 150 that is established through a previous verification process. For example, prior to the current search session, the user 140 can provide verification information to the search engine 104 and/or the entity listing portal engine 106 to verify that the user 104 is the owner of the entity 150.

In some implementations, the search engine 106 provides a search result webpage, e.g., the search results page 202 in response to determining that the user 140 that submitted the search query 160 is associated with the entity 150 in the entity listing database 110. Furthermore, the search results webpage 202 can include the search results 206 that are generated responsive to the search query 160; and can further include an interface through with edits to the data associated with the entity 150 within the entity listing database 110 can be provided. For example, the portal interface generator 124 can generate the interface 220 as shown in FIG. 2. The interface 220 is included within the search results page 202 and is provided responsive to the search query 160. The user 160 can interact with the interface 220 to access, edit, and/or update information associated with the entity 150 that is stored and provided by the entity listing database 110. By providing the interface 220 within the search results page 202, the user 140 is able to access information associated with the entity 140 that was previously only available through a second, separate service—e.g., as provided by the entity listing portal engine 106. As a result, the information associated with the entity 140 as stored by the entity listing database 110 is provided through a secondary service, e.g., through the search results "service" of the search results engine 106, while being maintained within the secondary service and a single web service. This minimizes back and forth action between multiple services, e.g., the search "service" and the entity listing portal "service," and provides a single access point for two differing platforms—search and entity listings.

In some examples, the interface 220 can include a header portion 240, button portion 242, a carousel portion 244, and a footer portion 246. The header portion 240 can include the name of the entity 150, e.g., "Kitchen Sink," and other relevant information of interest, including a number of page views of a URL or URLs associated with the entity 150, and a trending indicator of such page views for a particular time period. The button portion 242 can include a series of selectable buttons, such that when selected by the user 140 interacting with the interface 220, provide possible actions for the user 140—such as "edit info," "create (social networking) post," "add photo" and "reviews." The carousel portion 244 includes a plurality of cards 246 that serves as a dynamic "to-do list" for the user 140. For example, a first card 246*a* provides an interface of a recent social network review of the entity 150, and includes a comment section, e.g., "read and reply," that when enabled, facilitates the user 140 in providing a comment response to the review. The second card 246*b* provides a photo interface of photos associated with the entity 150 in the entity listing database 110. In some examples, the second card 264*b* can provide an interface for the user 140 to associate a new photo, e.g., upload, with the entity 150 within the entity listing database 110. The third card 246*c* provides an interface for the user 140 to generate a computer-implemented social network post relating to the entity 150. The footer portion 246 includes information indicating that the interface 220 is only visible to the user 140. In some examples, the interface 220 is modular—additional modules can be added or removed as desired. In some examples, the carousel portion 244 can include cards 246 based on a ranking of the cards.

In some implementations, after interacting with the interface 220, including the user 140 accessing, updating, and/or editing the information of the entity 150, the search engine 104 provides such edits to the entity listing portal engine 106. In response, the entity listing portal engine 106 updates the entity listing database 110, and in particular, updates the information associated with the entity 150 as referenced by the entity listing database 110. In some examples, the search engine 104 provides such edits to the entity listing engine 106 in "real-time"—that is, as the user 140 provides such edits to the interface 220. In some examples, the search engine 140 provides such edits to the entity listing engine 106 in response to user input indicating to update the entity listing database 110.

Figure 3:
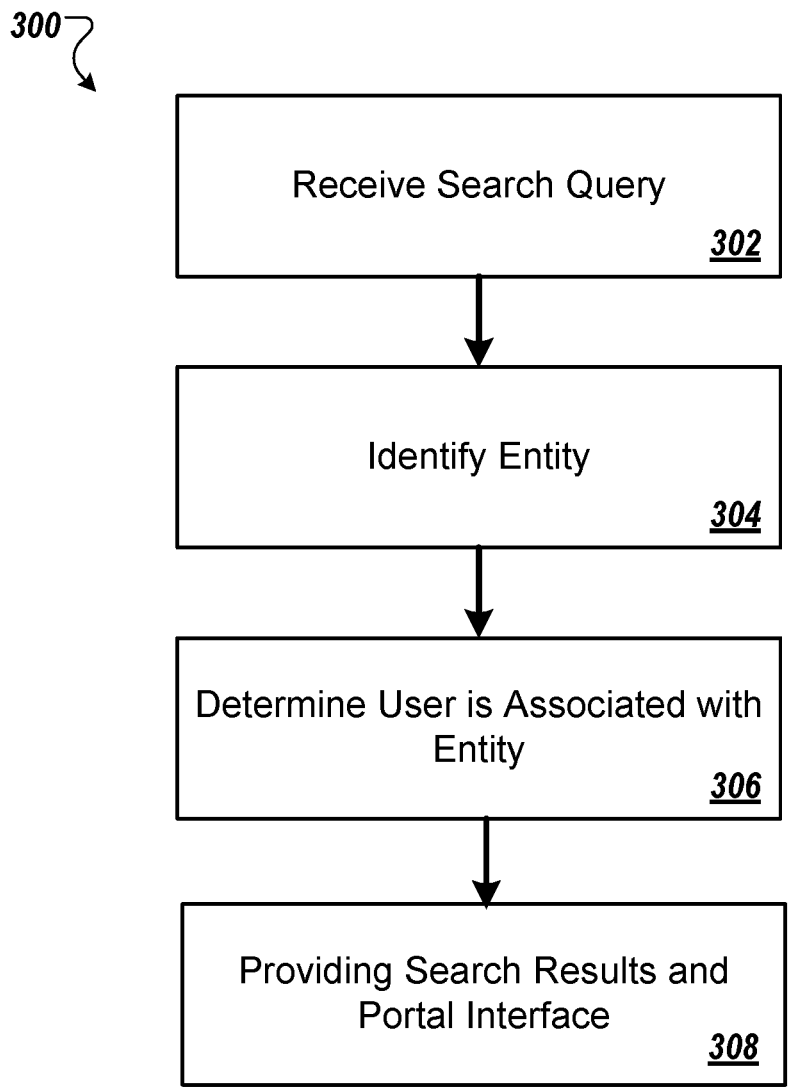
FIG. 3 depicts a flowchart of an example process for presentation of an entity portal interface within a search results page.

FIG. 3 depicts a flowchart of an example process 300 for presenting of an entity portal interface within a search results page. The example process 300 can be executed using one or more computing devices. For example, the computing device 102 and the search engine 104 can be used to execute the example process 300.

The search query 140 is received at the search engine 104 (302). For example, the user 140 submits the search query 160 to the search engine 104 utilizing the computing device 102, e.g., through a search service interface provided by the search engine 104 and displayed by the computing device 102. The computing device 102 can transmit the search query 160 to the search engine 104 over the network 112.

The entity identifier module 120 of the search engine 104 identifies the entity 150 that is associated with the search query 160 (304). For example, the entity identifier module 102 can identify the entity 150 based on i) keywords included by the search query 160 that refer to the entity 150, ii) the search results 206 that refer to the entity 150, iii) the knowledge panel 208 that is triggered in response to the search query 150, or a combination of the above.

The owner identifier module 122 of the search engine 104 determines that the user 140 that submitted the search query 160 to the search engine 104 is associated with the entity 150 in the entity listing database 110 (306). For example, the owner identifier module 122 determines that the user 140 is logged in during the search session that includes the submission of the search query 160 to the search engine 140, and compares login credentials of the user 140 with the entity listing database 110 to determine that the user 140 is associated with the entity 150.

The portal interface generator 124 of the search engine 104 provides the search results page 202 to the computing device 102 (308). For example, in response to determining that the user 140 that submitted the search query 160 to the search engine 104 is associated with the entity 150 in the entity listing database 110, the portal interface generator 124 provides the search result page 202 to the computing device 102. The search results page 202 can include i) the search results 206 that the search engine 104 generated responsive to the search query 160 and ii) the interface 220 through which edits to the data associated with the entity 150 within the entity listing database 110.

Figure 4:
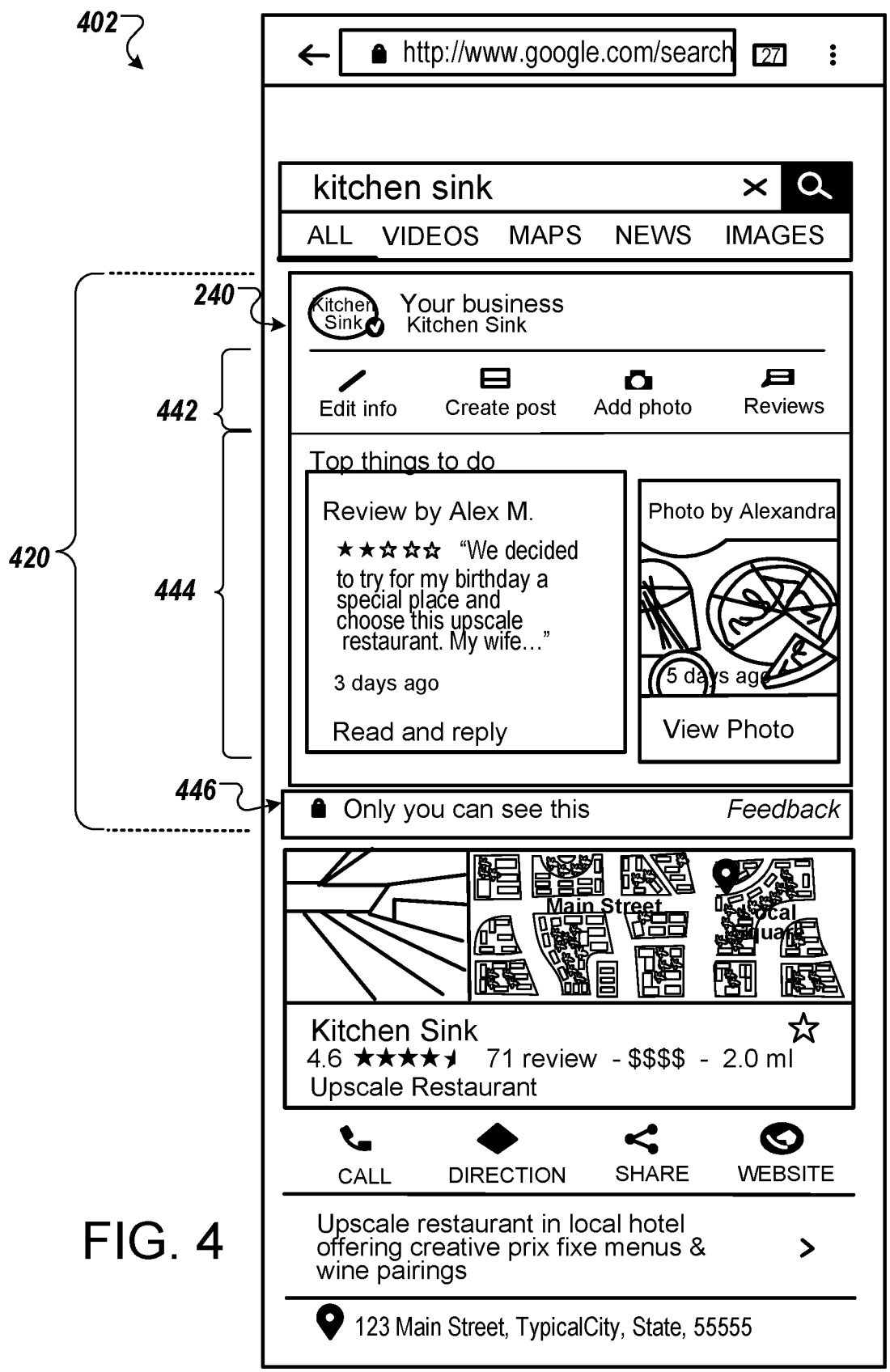
FIG. 4 depicts a search results page including the entity portal interface, in a second example.

FIG. 4 illustrates a further search results page 402 that can be provided by the search engine 106 in response to determining that the user 140 that submitted the search query 160 is associated with the entity 150 in the entity listing database 110. Specifically, the search results page 402 can be provided on a mobile computing platform. The search results page 402 can include an interface 420 substantially similar to interface 220 of the search results page 202. Specifically, the interface 420 can include a header portion 440, a button portion 442, a carousel portion 444, and a footer portion 446, substantially similar to the header portion 240, the button portion 242, the carousel portion 244, and the footer portion 246 of FIG. 2, respectively.

Figure 5:
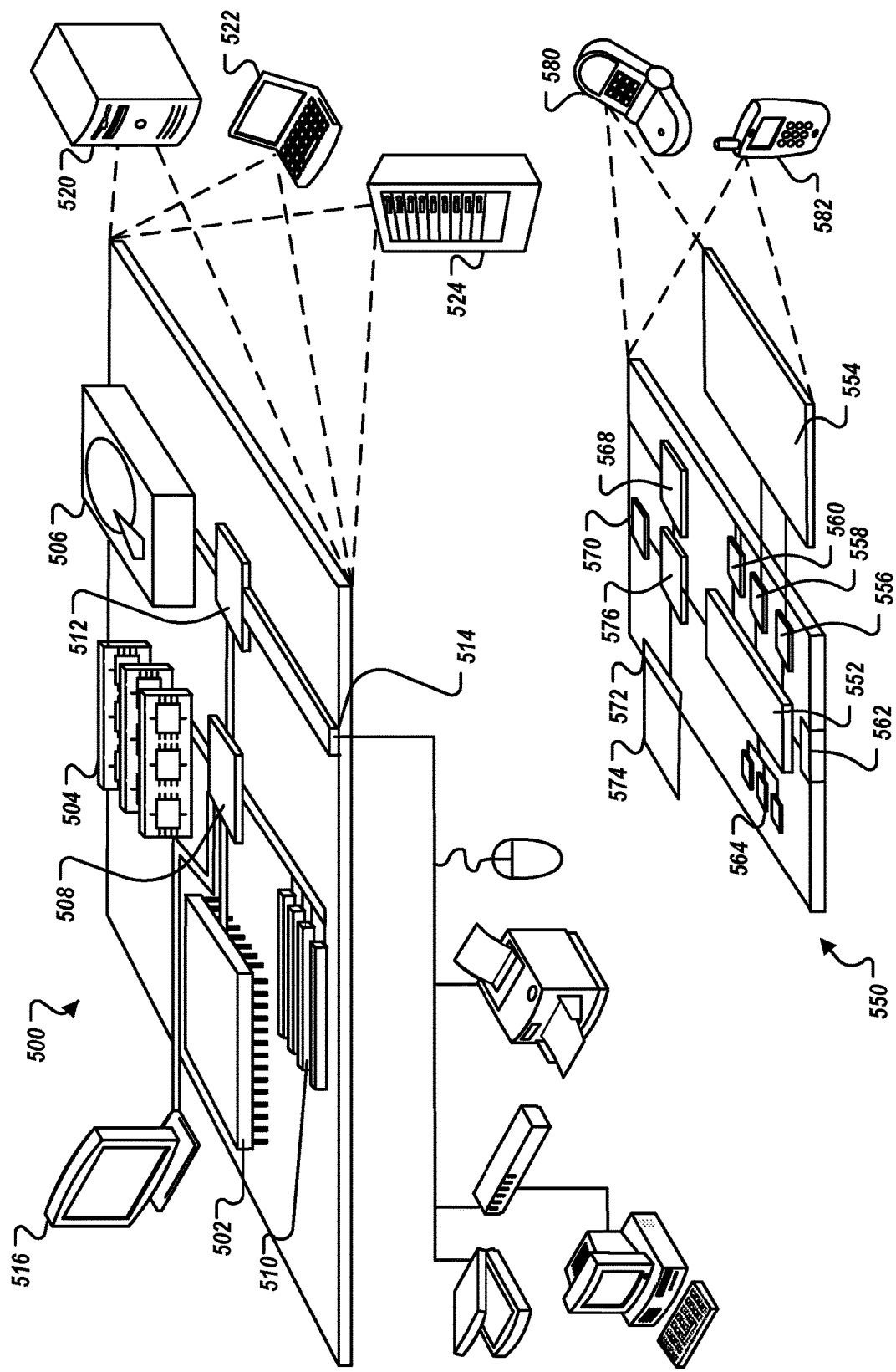
FIG. 5 depicts a flowchart of an example computing system and a mobile computing device that may be used to implement the techniques described herein.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 may process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 504, the storage device 506, or a memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 may execute instructions within the computing device 640, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 648 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 may be implemented as one or more of a computer-readable medium or media, a volatile memory unit or units, or a non-volatile memory unit or units. Expansion memory 554 may also be provided and connected to device 550 through expansion interface 552, which may include, for example, a SIMM (Single In Line Memory Module) card interface. Such expansion memory 554 may provide extra storage space for device 550, or may also store applications or other information for device 550. Specifically, expansion memory 554 may include instructions to carry out or supplement the processes described above, and may include secure information also. Thus, for example, expansion memory 554 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 554, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA TDMA PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 550 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube)

or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

While this disclosure includes some specifics, these should not be construed as limitations on the scope of the disclosure or of what may be claimed, but rather as descriptions of features of example implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A computer-implemented method, comprising:
receiving, at a search engine, a search query submitted by a user to the search engine, and wherein the search engine is provided by a search service;
receiving search results that the search engine generated responsive to the search query and a knowledge panel that is generated by the search engine and triggered based on the search query, and wherein the knowledge panel is separate from the search results and provides information specific to an entity with which the knowledge panel is associated;
in response receiving the knowledge panel, identifying an entity that is associated with the search query by identifying the entity with which the knowledge panel is associated;
determining, by the search service, that the user that submitted the search query to the search engine is associated with the entity which the knowledge panel is associated in an entity listing portal, wherein the entity listing portal is provided by a portal listing service that is separate from the search service;
providing a search results webpage that includes the search results the search engine generated responsive to the query; and
in response to determining that the user that submitted the search query to the search engine is associated with the entity with which the knowledge panel is associated in the entity listing portal, providing, in the search results webpage, an interface through which edits to data associated with the entity within the entity listing portal can be provided, wherein the interface through which the edits can be provided is provided by the portal listing service and without requiring the user to separately log in to or perform a separate authentication to the portal listing service.

2. The method of claim 1, wherein the search query includes keywords that refer to the entity.

3. The method of claim 1, wherein the entity is associated with one or more of the search results.

4. The method of claim 1, wherein the user is associated with the entity in the entity listing portal as an owner of the entity that is established through a verification process.

5. The method of claim 1, further comprising:
determining that the user is logged in during a search session that includes the submission of the search query by the user to the search engine; and
in response to determining that the user is logged in during a search session that includes the submission of the search query by the user to the search engine, comparing login credentials of the user with the entity listing portal to determine that the user is associated with the entity in the entity listing portal.

6. The method of claim 1, wherein the edits to the data associated with the entity within the entity listing portal can include:
associating a photo with the entity in the entity listing portal,
providing a comment responsive to a consumer-provided review of the entity through a computer-implemented social network, and
generating a computer-implemented social network post relating to the entity.

7. A system comprising:
one or more computers and one or more storage devices storing instructions that are operable, when executed by the one or more computers, to cause the one or more computers to perform operations comprising:
receiving, at a search engine, a search query submitted by a user to the search engine, and wherein the search engine is provided by a search service;
receiving search results that the search engine generated responsive to the search query and a knowledge panel that is generated by the search engine and that is triggered based on the search query, and wherein the knowledge panel is separate from the search results and provides information specific to an entity with which the knowledge panel is associated;
in response receiving the knowledge panel, identifying an entity that is associated with the search query by identifying the entity with which the knowledge panel is associated;
determining, by the search service, that the user that submitted the search query to the search engine is associated with the entity with which the knowledge panel is associated in an entity listing portal, wherein the entity listing portal is provided by a portal listing service that is separate from the search service;
providing a search results webpage that includes the search results the search engine generated responsive to the query; and
in response to determining that the user that submitted the search query to the search engine is associated with the entity with which the knowledge panel is associated in the entity listing portal, providing, in the search results webpage, an interface through which edits to data associated with the entity within the entity listing portal can be provided, wherein the interface through which the edits can be provided is provided by the portal listing service and without requiring the user to separately log in to or perform a separate authentication to the portal listing service.

8. The system of claim 7, wherein the search query includes keywords that refer to the entity.

9. The system of claim 7, wherein the entity is associated with one or more of the search results.

10. The system of claim 7, wherein the user is associated with the entity in the entity listing portal as an owner of the entity that is established through a verification process.

11. The system of claim 7, the operations further comprising:
determining that the user is logged in during a search session that includes the submission of the search query by the user to the search engine; and
in response to determining that the user is logged in during a search session that includes the submission of the search query by the user to the search engine, comparing login credentials of the user with the entity listing portal to determine that the user is associated with the entity in the entity listing portal.

12. The system of claim 7, wherein the edits to the data associated with the entity within the entity listing portal can include:
associating a photo with the entity in the entity listing portal,
providing a comment responsive to a consumer-provided review of the entity through a computer-implemented social network, and
generating a computer-implemented social network post relating to the entity.

13. A non-transitory computer-readable medium storing software comprising instructions executable by one or more computers which, upon such execution, cause the one or more computers to perform operations comprising:
receiving, at a search engine, a search query submitted by a user to the search engine, and wherein the search engine is provided by a search service;
receiving search results that the search engine generated responsive to the search query and a knowledge panel that that is generated by the search engine and is triggered based on the search query, and wherein the knowledge panel is separate from the search results and provides information specific to an entity with which the knowledge panel is associated;
in response receiving the knowledge panel, identifying an entity that is associated with the search query by identifying the entity with which the knowledge panel is associated;
determining, by the search service, that the user that submitted the search query to the search engine is associated with the entity with which the knowledge panel is associated in an entity listing portal, wherein the entity listing portal is provided by a portal listing service that is separate from the search service;
providing a search results webpage that includes the search results the search engine generated responsive to the query; and
in response to determining that the user that submitted the search query to the search engine is associated with the entity with which the knowledge panel is associated in the entity listing portal, providing, in the search results webpage, an interface through which edits to data associated with the entity within the entity listing portal can be provided, wherein the interface through which the edits can be provided is provided by the portal listing service and without requiring the user to separately log in to or perform a separate authentication to the portal listing service.

14. The computer-readable medium of claim 13, wherein the search query includes keywords that refer to the entity.

15. The computer-readable medium of claim 13, wherein the entity is associated with one or more of the search results.

* * * * *